（12) United States Patent
Dong et al.

(10) Patent No.: US 10,372,320 B2
(45) Date of Patent: Aug. 6, 2019

(54) DEVICE AND METHOD FOR OPERATING ON TOUCH SCREEN, AND STORAGE MEDIUM

(71) Applicant: HISENSE MOBILE COMMUNICATIONS TECHNOLOGY CO., LTD., Qingdao (CN)

(72) Inventors: Tiantian Dong, Qingdao (CN); Renliang Sun, Qingdao (CN)

(73) Assignees: Hisense Mobile Communications Technology Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 133 days.

(21) Appl. No.: 15/085,236

(22) Filed: Mar. 30, 2016

(65) Prior Publication Data

US 2017/0052620 A1   Feb. 23, 2017

(30) Foreign Application Priority Data

Aug. 17, 2015   (CN) .......................... 2015 1 0504431

(51) Int. Cl.
*G06F 3/0488*   (2013.01)
(52) U.S. Cl.
CPC ................................ *G06F 3/04883* (2013.01)
(58) Field of Classification Search
None
See application file for complete search history.

(56) References Cited

U.S. PATENT DOCUMENTS 8,493,338 B2 *  7/2013  Nakajoh ............. G06F 3/04883
                                                         345/156
9,606,726 B2 *  3/2017  Park .................... G06F 3/04886
                       (Continued)

FOREIGN PATENT DOCUMENTS

CN         103324340 A      9/2013
CN         103488419 A      1/2014
                 (Continued)

OTHER PUBLICATIONS

Office Action from corresponding Chinese Application No. 201510504431.6 dated Apr. 17, 2018 (8 pages).

*Primary Examiner* — Chanh D Nguyen
*Assistant Examiner* — Karin Kiyabu
(74) *Attorney, Agent, or Firm* — Harness, Dickey & Pierce, P.L.C.

(57) ABSTRACT

This disclosure discloses a device and method for operating on a touch screen, and a storage medium. The device includes one or more processors and a memory, the one or more processors are configured to perform: determining a target touched point in a first area of the touch screen according to a sliding operation or a clicking operation by a user in the first area; determining a target mapped point in a second area of the touch screen, corresponding to the target touched point in the first area; and if it is determined that the user needs to click on the target mapped point, then clicking on the target touched point in the first area, corresponding to the target mapped point in the second area to thereby click on the target mapped point, wherein the first area and the second area do not overlap with each other.

18 Claims, 7 Drawing Sheets

(56) References Cited

U.S. PATENT DOCUMENTS

| | | | |
|---|---|---|---|
| 9,626,102 B2* | 4/2017 | Kim | G06F 3/0482 |
| 9,916,085 B2* | 3/2018 | Lee | G06F 3/04886 |
| 2009/0122022 A1* | 5/2009 | Park | G06F 3/0488 |
| | | | 345/173 |
| 2010/0182264 A1* | 7/2010 | Hahn | G06F 1/1626 |
| | | | 345/173 |
| 2012/0044164 A1* | 2/2012 | Kim | G06F 3/04842 |
| | | | 345/173 |
| 2012/0092299 A1* | 4/2012 | Harada | G06F 3/04883 |
| | | | 345/174 |
| 2013/0237288 A1* | 9/2013 | Lee | G06F 3/041 |
| | | | 455/566 |
| 2013/0307801 A1* | 11/2013 | Nam | G06F 3/041 |
| | | | 345/173 |
| 2014/0028602 A1* | 1/2014 | Morinaga | G06F 1/1626 |
| | | | 345/173 |
| 2014/0160073 A1* | 6/2014 | Matsuki | G06F 3/0485 |
| | | | 345/174 |
| 2014/0184503 A1* | 7/2014 | Jang | G06F 3/0488 |
| | | | 345/158 |
| 2014/0380209 A1* | 12/2014 | Tsukamoto | G06F 3/0484 |
| | | | 715/763 |
| 2015/0082230 A1* | 3/2015 | Lee | G06F 3/04886 |
| | | | 715/773 |
| 2015/0205522 A1* | 7/2015 | Zeng | G06F 3/04886 |
| | | | 715/847 |
| 2016/0196034 A1* | 7/2016 | Chen | G06F 3/04812 |
| | | | 715/856 |
| 2017/0010806 A1* | 1/2017 | Pingco | G06F 3/04886 |

FOREIGN PATENT DOCUMENTS

| | | | | |
|---|---|---|---|---|
| CN | 103593136 A | 2/2014 | | |
| CN | 103635873 A | 3/2014 | | |
| CN | 104298462 A | 1/2015 | | |
| CN | 104346085 A | 2/2015 | | |
| WO | WO-2012081178 A1 * | 6/2012 | | G06F 3/0482 |

* cited by examiner

DEVICE AND METHOD FOR OPERATING ON TOUCH SCREEN, AND STORAGE MEDIUM

CROSS-REFERENCE TO RELATED APPLICATION

This application claims the benefit and priority of Chinese Patent Application No. 201510504431.6 filed Aug. 17, 2015. The entire disclosure of the above application is incorporated herein by reference.

FIELD

This disclosure relates to the field of electronic technologies and particularly to a device and method for operating on a touch screen, and a storage medium.

BACKGROUND

This section provides background information related to the present disclosure which is not necessarily prior art.

In recent years, touch screens have been developed rapidly. Since the touch screens can enable users to search for and view useful information rapidly, but also have the advantages of being robust, durable, and highly interactive, saving a space of physical buttons, functioning flexibly, etc. Accordingly the touch screens have been increasingly applied by the users along with an increasing number of searches for multimedia information.

At present the touch screens instead of the physical buttons have become a predominant instrument to input information into mobile phones. The mobile phones are tending to evolve from simple communication facilities into audio and video entertainment end devices, so there is an increasing demand of the users for a display effect on screens of the mobile terminals. The sizes of the screens of the mobile terminals have been changed from the original predominant 3.5 inches to 5 inches. It becomes difficult to operate on the touch screens of the mobile phones using a single hand despite the improved display effect. At present the touch screens are operated on using the thumb of the single hand while the other four fingers are holding the mobile phones. At present there are generally the following two existing approaches to operate on a touch screen using a single hand:

1. Contents on the upper half of the screen are pulled down (where the upper half of the screen is blank), and the pulled-down half of the screen is operated on; and 2. The screen is activated to be shrunk, contents on the screen are shrunk in preserving proportionality mode and displayed, and the shrunk screen is operated on.

SUMMARY

This section provides a general summary of the disclosure, and is not a comprehensive disclosure of its full scope or all of its features.

An embodiment of this disclosure provides a device for operating on a touch screen, the device including:

a target touched point determining module configured to determine a target touched point in a first area of the touch screen according to a sliding operation or a clicking operation by a user in the first area;

a target mapped point determining module configured to determine a target mapped point in a second area of the touch screen, corresponding to the target touched point in the first area; and a target mapped point clicking module configured, if it is determined that the user needs to click on the target mapped point, to click on the target touched point in the first area, corresponding to the target mapped point in the second area to thereby click on the target mapped point, wherein the first area and the second area of the touch screen do not overlap with each other.

An embodiment of this disclosure further provides a storage medium, storing therein computer readable program codes configured to be executed by one or more processors to perform operations of determining a target touched point in a first area of the touch screen according to a sliding operation or a clicking operation by a user in the first area;

determining a target mapped point in a second area of the touch screen, corresponding to the target touched point in the first area; and if it is determined that the user needs to click on the target mapped point, then clicking on the target touched point in the first area, corresponding to the target mapped point in the second area to thereby click on the target mapped point, wherein the first area and the second area of the touch screen do not overlap with each other.

An embodiment of this disclosure further provides a method for operating on a touch screen, the method including:

determining a target touched point in a first area of the touch screen according to a sliding operation or a clicking operation by a user in the first area;

determining a target mapped point in a second area of the touch screen, corresponding to the target touched point in the first area; and if it is determined that the user needs to click on the target mapped point, then clicking on the target touched point in the first area, corresponding to the target mapped point in the second area to thereby click on the target mapped point, wherein the first area and the second area of the touch screen do not overlap with each other.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

In a method for operating on a touch screen according to an embodiment of this disclosure, a target touched point in a first area of the touch screen is determined according to a sliding operation or a clicking operation by a user in the first area; and if it is determined that the user needs to click on the target mapped point, then the target touched point in the first area, corresponding to the target mapped point in the second area is clicked on to thereby complete the clicking operation on the target mapped point. In the embodiment of this disclosure, according to the operation by the user in one of the areas, the other area can be operated on, so the user can operate on the area of the touch screen, which is not easy to be touched, in the area which is easy to be touched, without shrinking or moving displayed contents.

Figure 1:
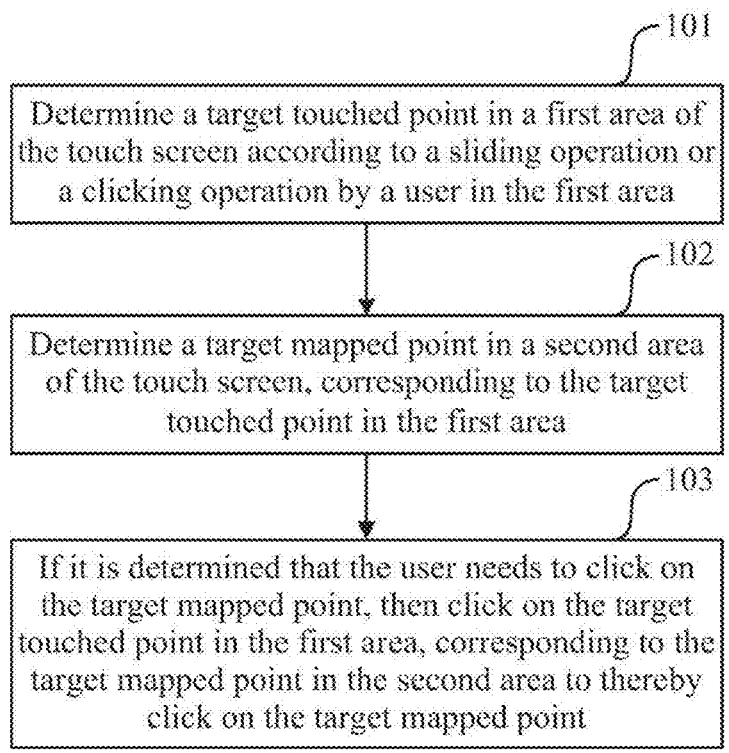
FIG. 1 is a schematic diagram of a method for operating on a touch screen according to an embodiment of this disclosure.

As illustrated in FIG. 1, a method for operating on a touch screen according to an embodiment of this disclosure includes:

The operation 101 is to determine a target touched point in a first area of the touch screen according to a sliding operation or a clicking operation by a user in the first area;

The operation 102 is to determine a target mapped point in a second area of the touch screen, corresponding to the target touched point in the first area; and The operation 103 is, if it is determined that the user needs to click on the target mapped point, to click on the target touched point in the first area, corresponding to the target mapped point in the second area to thereby realize the operation of clicking on the target mapped point, Where the first area and the second area of the touch screen do not overlap with each other.

The touch screen according to the embodiment of this disclosure can be a capacitive touch screen, a resistive touch screen, or a touch screen manufactured in another process. An executor in the embodiment of this disclosure is a touch device, e.g., a mobile phone, a tablet computer, etc.

In the embodiment of this disclosure, the touch screen is divided into at least two areas in a mapping mode, where the first area is an operation area, and a clicking or sliding operation by the user in the first area will not act on an object (e.g., an application icon, a button, etc.) in the first area. For example, if there is an application icon in the first area, then the application will not be opened although the user clicks on the application icon.

The second area is a mapped area of the first area, and a touching operation by the user in the first area will act on an object in the second object. For example, if the user needs to start an application in the second area, then the application in the second area can be started as long as the user operates on the first area.

Here the mapping mode can be enabled in a number of ways, for example, by making a specific gesture on the touch screen. The user can enable the mapping mode by sliding his or her finger at 45° from the bottom-left corner to the upper right of the touch screen. The gesture can be preset by the user as desirable.

The mapping mode can alternatively be enabled by shaking the touch device, through voice, a button, etc., for example, the touch device can be shaken so that the touch device is shaken leftward and then rightward rapidly while the touch screen of the touch device is faced up.

In addition to the approaches to enable the mapping mode, the embodiment of this disclosure further provides a number of approaches to disable the mapping mode. For example, a specific gesture is made on the touch screen, where the user can disable the mapping mode by sliding his or her finger from the center of the touch screen to the bottom-left corner of the touch screen. The gesture can be preset by the user as desirable.

The mapping mode can alternatively be disabled by shaking the touch device, through voice, a button, etc., for example, the touch device can be shaken so that the touch device is shaken rightward and then leftward rapidly while the touch screen of the touch device is faced up.

Positions and coverages of the respective areas on the touch screen in the embodiment of this disclosure can be preset or can be set by the user himself or herself.

Figure 2:
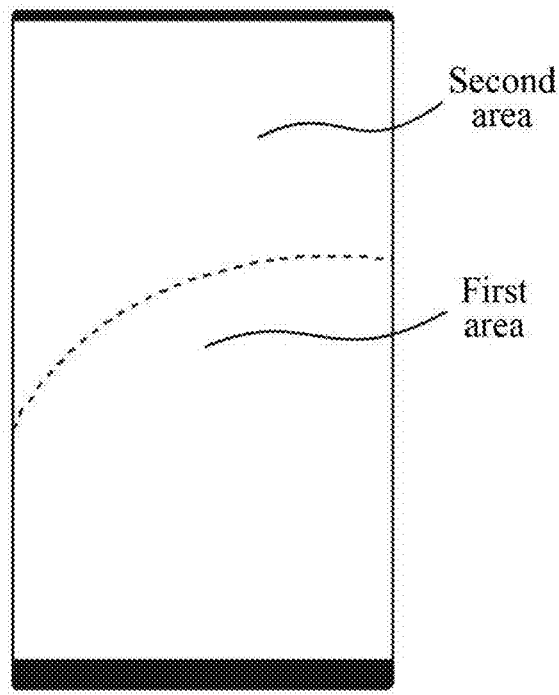
FIG. 2 is a schematic diagram of division into a first area and a second area according to an embodiment of this disclosure.
Figure 3:
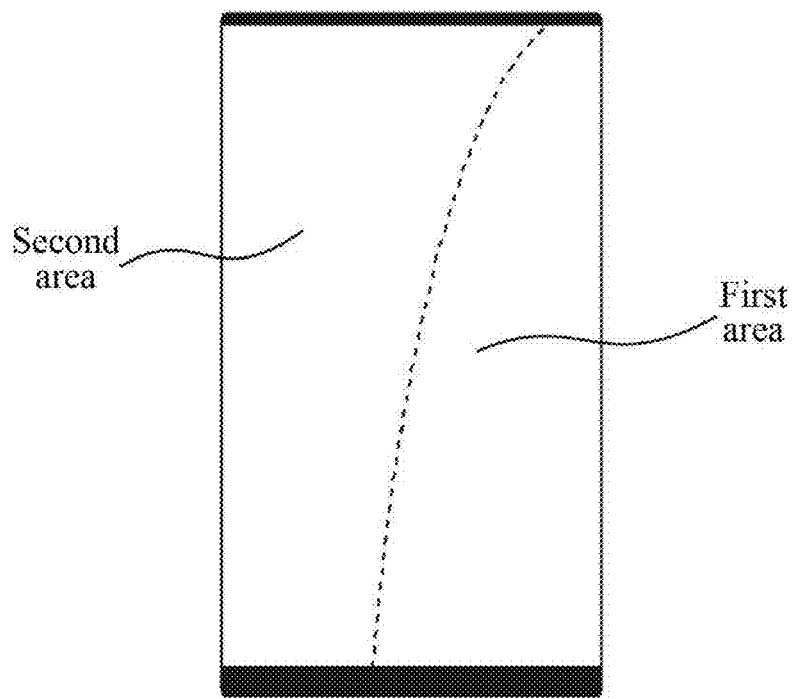
FIG. 3 is a schematic diagram of division into a first area and a second area according to another embodiment of this disclosure.

For example, if the touch screen includes a first area and a second area, then the first area and the second area can be positioned so that the first area is on the lower side, and the second area is on the upper side, as illustrated in FIG. 2; or the first area is on the right side, and the second area is on the left side, as illustrated in FIG. 3. The positions of the first area and the second area have been described above only as an example, and in an application, the first area and the second can be positioned flexibly.

The touch screen includes other areas in addition to the first area and the second area, for example, the touch screen includes a first area, a second area, and a third area, where the third area is a normal operation area which can respond to a touching operation by the user in the third area after this operation is identified. For example, if the user clicks on an application icon in the third area, then this operation will be responded to directly by opening an application corresponding to the application icon.

Figure 4:
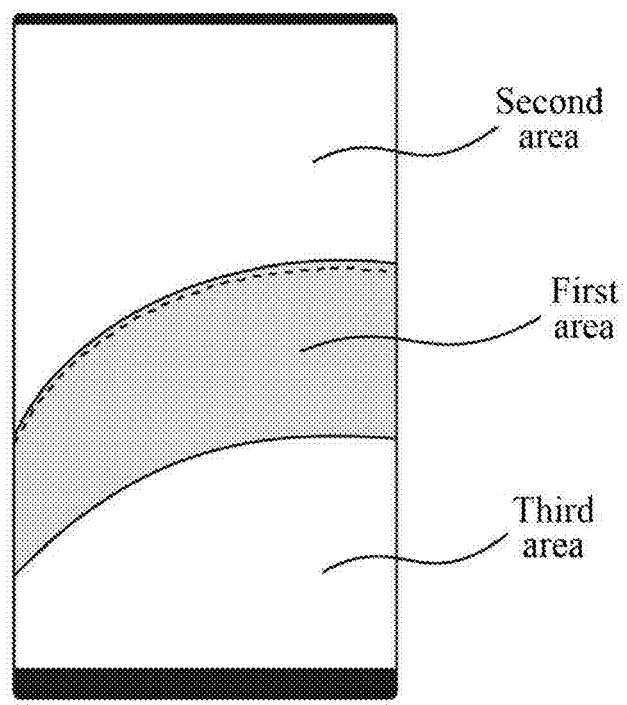
FIG. 4 is a schematic diagram of division into a first area, a second area, and a third area according to an embodiment of this disclosure.
Figure 5:
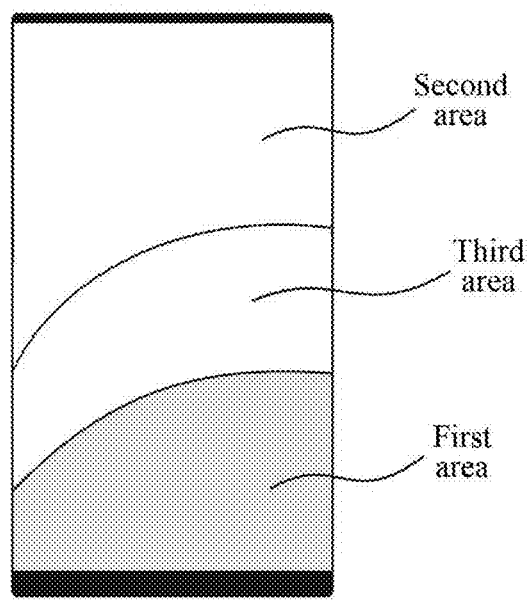
FIG. 5 is a schematic diagram of division into a first area, a second area, and a third area according to another embodiment of this disclosure.

The first area, the second area, and the third area can be positioned so that the first area is in the middle, the second area is on the upper side, and the third area is on the lower side, as illustrated in FIG. 4; or the first area is on the lower side, the second area is on the upper side, and the third area is in the middle, as illustrated in FIG. 5. The positions of the first area, the second area, and the third area have been described above only as an example, and in an application, the first area, the second area, and the third area can be positioned flexibly.

If a touched position of and a touching operation by the user in the second area of the touch screen are identified, then the touching operation will be performed at the touched position in the second area. For example, if there is an application icon in the second area, then the application will be opened after a click operation by the user's finger at the application icon in the second area is identified.

Alike when the touch screen includes the third area, if a touched position of and a touching operation by the user in the third area of the touch screen are identified, then the touching operation will be performed at the touched position in the third area. For example, if there is an application icon in the third area, then the application will be opened after a click operation by the user's finger at the application icon in the third area is identified.

In an implementation, if the areas are set by the user himself or herself, then the touch screen can be divided by a touch trajectory of the user. An example of dividing the touch screen by a touch trajectory of the user will be presented below, and it shall be noted that although the following example is presented, any other schemes to divide the touch screen by a touch trajectory of the user will be applicable to the embodiment of this disclosure.

A screen of a mobile phone will be divided into a first area and a second area, while the bottom of the mobile phone is being held in a single hand, if the stretched thumb of the hand is sliding on the screen of the mobile phone, then the trajectory of the fingertip (or slightly higher) will be a boundary line between the first area and the second area so that the area of the touch screen above the boundary line is the second area, and the area of the touch screen below the boundary line is the first area.

A screen of a mobile phone will be divided into a first area, a second area, and a third area, while the bottom of the mobile phone is being held in a single hand, if the stretched thumb of the hand is sliding on the screen of the mobile phone, then the trajectory of the fingertip (or slightly higher) will be a boundary line between the first area and the second area so that the area of the touch screen above the boundary line is the second area, and the area of the touch screen below the boundary line is the first area. The trajectory of the lower edge of the finger pad will be a boundary line between the first area and the third area so that the area of the touch screen above the boundary line is the first area, and the area of the touch screen below the boundary line is the third area.

In an implementation, the user may perform a sliding operation or a one-clicking operation in the first area of the touch screen in the operation 101 and the operation 102, as described below respectively.

In a first approach, the user performs the sliding operation in the first area of the touch screen.

If a sliding operation by the user in the first area of the touch screen is identified, then a target touched point in the first area will be determined according to the sliding operation by the user in the first area of the touch screen.

Touched points touched by the user during the sliding operation in the first area are identified; and the last touched point in the first area during the sliding operation is determined as the target touched point in the first area.

Optionally after the touched points touched by the user during the sliding operation in the first area are identified, a target mapped point in the second area of the touch screen, corresponding to the target touched point in the first area can be determined after the target touched point in the first area is determined, that is, the touch device will not determine the mapped points in the second area according to the touched points in the first area during the sliding operation, instead, at the end of the sliding operation, the last touched point in the first area is determined as the target touched point, and then the target mapped point is determined according to the target touched point.

Alternatively if a touched point touched by the user during the sliding operation in the first area is identified, then a mapped point in the second area of the touch screen, corresponding to the touched point will be determined. For example, if there are 10 touched points touched by the user during the sliding operation in the first area is identified, then 10 mapped points in the second area of the touch screen, corresponding to the 10 touched points will be determined. That is, after a touched point of the user in the first area is identified, a mapped point in the second area, corresponding to the identified touched point is determined according to the position of the touched point in the first area. That is, if the user performs the sliding operation in the first area, then a touched point touched by the user in the first area will be identified, and a mapped point in the second area will be determined in real time according to the touched point. At the end of the sliding operation performed in the first area, the last identified touched point touched by the user in the first area during the sliding operation will be determined as the target touched point in the first area.

Here at the end of the sliding operation, the finger is stopped from sliding without touching the screen any longer, and if the user stops the finger form sliding while touching the screen, then the sliding operation will be paused instead of being terminated.

Optionally in the embodiment of the disclosure, the mapped point in the second area can be determined according to the position of the touched point.

For a touched point, a second abscissa in the second area, corresponding to a first abscissa in the first area, of the touched point in the first area is determined according to a correspondence relationship between the first abscissa and the second abscissa, and a second ordinate in the second area, corresponding to a first ordinate in the first area, of the touched point in the first area is determined according to a correspondence relationship between the first ordinate and the second ordinate; and The mapped point in the second area, corresponding to the touched point in the first area is determined according to the determined second abscissa and second ordinate.

In the embodiment of this disclosure, the touch screen consists of the same number of points as the number of pixels. All the points can be touched points. The points in the second area can be touched points or mapped points. The points in the first area are mapped to the points in the second area, and a touching operation can be performed on the touched points in the first area to thereby perform the same touching operation on the mapped point in the second area.

The respective points on the screen have their own respective abscissas and ordinates (the origin of the coordinates can be one of four corners on the screen). If the user performs a touching operation on the touch screen, then the touch screen can determine coordinates of a point corresponding to the touching operation. The touching operation may influence an object including the point. For example, if the mobile phone identifies a clicking operation by the user on a point located at the coordinates (1, 1), and there is a button including the point at the coordinates (1, 1) on the screen, then a pressing operation will be performed on the button.

The abscissa and the ordinate of the touched point in the first area can be mapped to the abscissa and the ordinate of the mapped point in the second area at the equal proportion.

Figure 6:
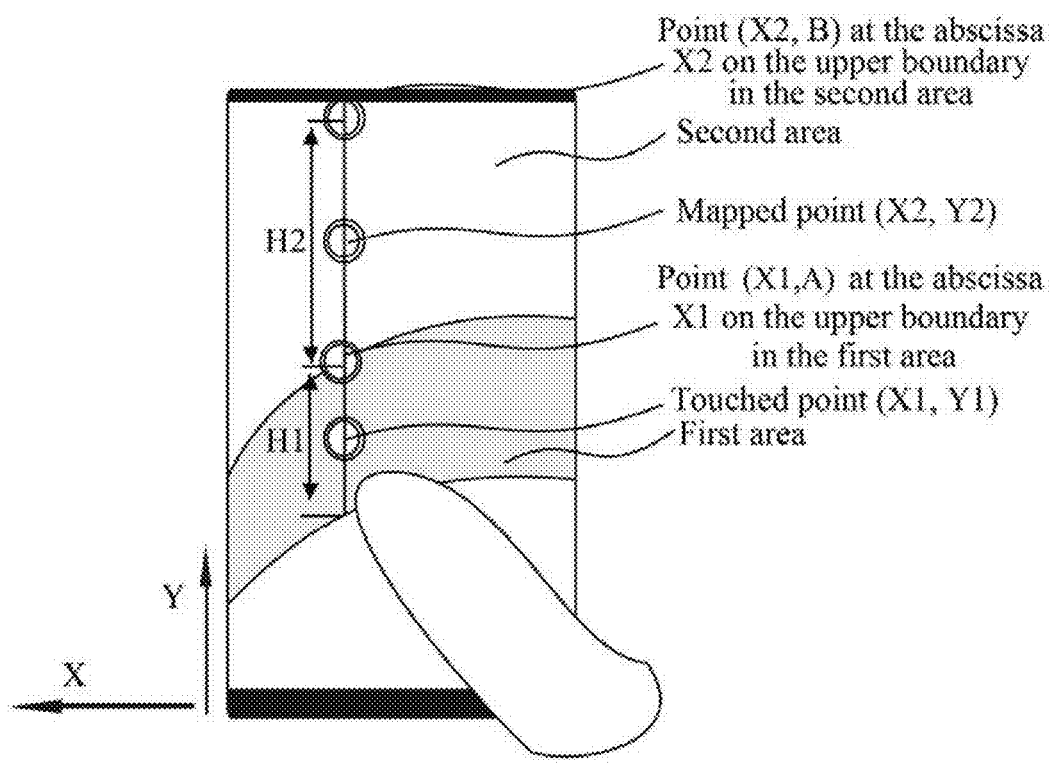
FIG. 6 is a schematic diagram of determination of coordinates of a mapped position from coordinates of a touched position according to an embodiment of this disclosure.

Optionally as illustrated in FIG. 6, the first abscissa in the first area corresponds to the second abscissa in the second area as follows:

$$X2=X1; \text{ and}$$

The first ordinate in the first area corresponds to the second ordinate in the second area as follows:

$$Y2-B=(H1/H2)\times(Y1-A);$$

Where X1 is the first abscissa of the touched point in the first area;

X2 is the second abscissa of the mapped point in the second area;

Y1 is the first ordinate of the touched point in the first area;

Y2 is the second ordinate of the mapped point in the second area;

A is an ordinate corresponding to a point at the abscissa of X1 on an upper boundary of the first area;

B is an ordinate corresponding to a point at the abscissa of X1 on an upper boundary of the second area;

H1 is the distance between the point at the abscissa of X1 on the upper boundary of the first area and a point at the abscissa of X1 on a lower boundary of the first area; and H2 is the distance between the point at the abscissa of X1 on the upper boundary of the second area and a point at the abscissa of X1 on a lower boundary of the second area.

Here Y2−B is the distance from a point in the second area to the upper boundary of the second area, and Y1−A is the distance from a point in the first area to the upper boundary of the first area, where they are in proportion. H1 can be regarded as the height of the first area if X=X1, or as the height of the second area if X=X2.

In the embodiment of this disclosure, the touch device identifies the last touched point touched by the user as the target touched point, where the mapped point corresponding thereto is referred to as the target mapped point.

Optionally the target mapped point in the second area of the touch screen, corresponding to the target touched point in the first area is determined as follows:

If the user performs the sliding operation in the first area of the touch screen, then a mapped point corresponding to the last touched point during sliding is determined as the target mapped point; and If the user performs the clicking operation in the first area of the touch screen, then a mapped point corresponding to a touched point during the once-clicking operation is determined as the target mapped point.

In the embodiment of this disclosure, the target mapped point in the second area is determined dependent upon the operation mode of the user in the first area. If the operation of the user is a sliding operation, then the touch control device determines the last mapped point in the second area as the target mapped point; and if the operation of the user is a clicking operation, then the touch control device determines a mapped point corresponding to a touched point of the clicking operation as the target mapped point.

In the embodiment of this disclosure, the target mapped point is determined so that after the target mapped point is determined, if it is determined that the user needs to click on the target mapped point, then the target mapped point can be clicked on by clicking the target touched point in the first area, corresponding to the target mapped point in the second area due to the mapping relationship between the target mapped point and the target touched point.

Optionally after the target mapped point in the second area, corresponding to the target touched point in the first area is determined, the method further includes:

If a clicking operation by the user in the first area is identified, then it is determined that the user needs to click on the target mapped point.

If the target touched point and the target mapped point exist, then the touch device determines that the user needs to click on the target mapped point, upon detecting that the user clicks on the screen in any one of the areas or in the first area (the user presses down, or presses down and then lifts up, and if the mapped point does not exist, then the same action will be referred to as an single-clicking operation). For example, if the target mapped point is on an application icon, then the user can perform a single-clicking operation at any touched point in the first area to thereby click on the target mapped point so as to open the application.

After the clicking operation on the target mapped point is performed, the target touched point and the target mapped point disappear. The user can determine again a target touched point and a target mapped point through a sliding or clicking operation in the first area. Moreover if the touch device identifies that the user disables the mapping mode (through a gesture or an action) before clicking on the target mapped point, then the target touched point and the mapped point will not appear.

Optionally in order to enable the user to view the mapping trajectory in the second area more intuitively, an operation focus can be preset in the second area. If the user performs the sliding operation in the first area of the touch screen, then the operation focus for displaying the position of the mapped point can be moved across the mapped point in the second area, corresponding to each of the touched points in the first area, so that the user can know the position in the second area, corresponding to the sliding operation in the first area.

If the user performs the sliding operation in the first area of the touch screen, and there is no operation focus in the second area, then an operation focus can be displayed at a preset position, or an operation focus can be displayed at a starting touched point of the sliding operation in the first area.

Here the operation focus can be a simple geometrical pattern, e.g., a circle, etc., and the operation focus is opaque or translucent. The user can further adjust the size, the shape, and/or the color of the operation focus. The operation focus can appear after the user starts a one-hand operating mode, or after a first touching operation after the user starts the mapping mode. If the operation focus is set to appear after the user starts a one-hand operating mode, then a default position where the operation focus appears will be preset in the second area. If the user disables the mapping mode, then the operation focus will disappear.

If a sliding operation by the user in the first area is identified, then the position of the operation focus will move with the varying mapped point, where the sliding operation is performed across the respective mapped points in the same order in which the touched points corresponding thereto are touched.

Figure 7:
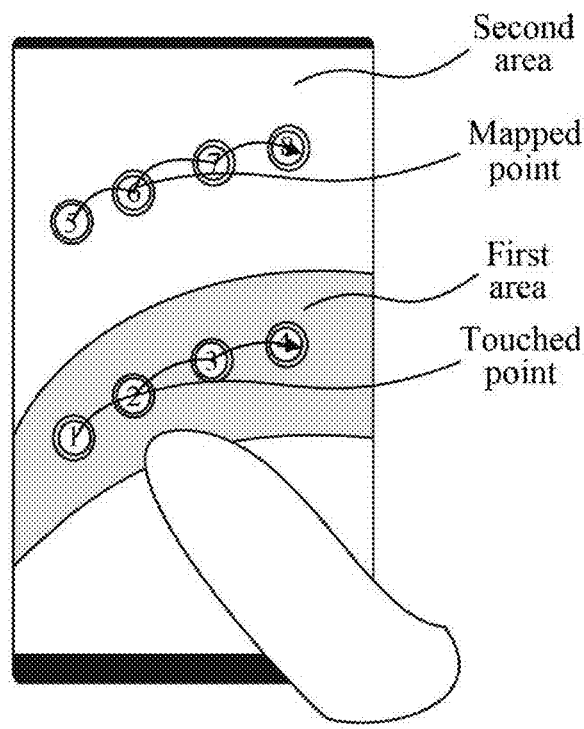
FIG. 7 is a schematic diagram of a relationship between a touched point and a mapped point during a sliding operation according to an embodiment of this disclosure.

For example, as illustrated in FIG. 7, if the touch screen identifies that four points 1, 2, 3 and 4 consecutive in coordinates in the first area are touched sequentially, then the points 1, 2, 3 and 4 are touched positions. The point 1 in the first area corresponds to a point 5 in the second area, the point 2 in the first area corresponds to a point 6 in the second area, the point 3 in the first area corresponds to a point 7 in the second area, and the point 4 in the first area corresponds to a point 8 in the second area. Thus the mobile phone performs a moving operation in the second area, and the points 5, 6, 7 and 8 are mapped positions. The mobile phone operates sequentially across the mapped positions 5, 6, 7 and 8.

After the user clicks on the target position, the target mapped points disappear, but the operation focus may still remain on the target mapped point until the identifying device identifies a next operation by the user on the touch device, and then the operation focus will be moved for a new mapped point.

In a second approach, the user performs a clicking operation in the first area of the touch screen.

If a clicking operation by the user in the first area of the touch screen is identified, then a target touched point in the first area is determined according to the clicking operation by the user in the first area.

A touched point of the user during the clicking operation in the first area is identified; and the identified touched point is determined as the target touched point in the first area.

The second approach in the embodiment of this disclosure is different from the first approach in that there is one touched point, which can be determined directly as a target touched point, in the second approach.

Figure 8:
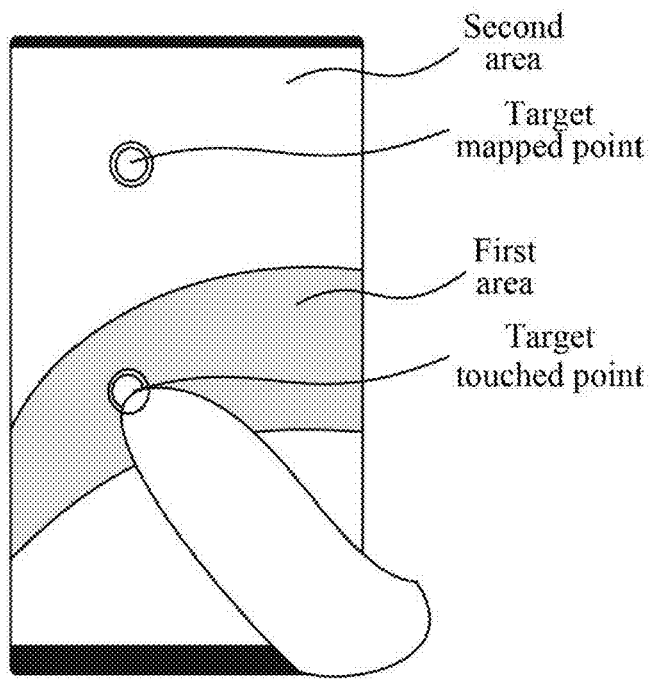
FIG. 8 is a schematic diagram of a target touched point and a target mapped point determined using a clicking operation according to an embodiment of this disclosure.

For example, as illustrated in FIG. 8, if the touch device identifies a click touched point 1 of the user in the first area, then the touched point 1 will be determined as a target touched point.

In the second approach, a target mapped point in the second area can be determined after the target touched point in the first area is determined. There is a mapping relationship between the target mapped point and the target touched point.

Optionally the mapping relationship between the target mapped point and the target touched point can include a mapping relationship between abscissas, and a mapping relationship between ordinates.

Optionally the mapping relationship between the target mapped point and the target touched point can be enabled through a gesture or an operation. The gesture and the operation are similar to those in the sliding operation. Alike the mapping relationship between the target mapped point and the target touched point can be disabled through a gesture or an operation.

Optionally in order to enable the user to view the position of the target mapped point in the second area more intuitively, an operation focus can be preset in the second area. The shape and the initial position of the operation focus can be as described for the sliding operation, so a repeated description thereof will be omitted here. If the user performs a clicking operation in the first area of the touch screen, then the operation focus will be moved onto the target mapped point.

After the target mapped point is determined, if it is determined that the user needs to click on the target mapped point, then the target touched point corresponding to the target mapped pint will be clicked on, where the touch device determines that the user needs to click on the target mapped point, upon identifying a clicking operation by the user on the screen at nay position (or in the first area).

Here the touch device determines that the user needs to click on the target mapped point, upon identifying a clicking operation (pressing down, or pressing down and then lifting up) by the user on the screen at nay position.

The division into the first area and the second area is the same as that in the first approach, so a repeated description thereof will be omitted here.

A mapped point 1 is determined according to a touched point 1. If the touch device identifies that the user needs to click on the mapped point 1, then the touched point corresponding to the mapped point 1 will be clicked on to thereby click on the mapped point 1.

Based upon the same inventive idea, an embodiment of this disclosure further provides a device including a touch screen, and since the device corresponds to the method according to the embodiment of this disclosure, and addresses the problem under the same principle as the method according to the embodiment of this disclosure, reference can be made to the implementation of the method for an implementation of the device, so a repeated description thereof will be omitted here.

Figure 9:
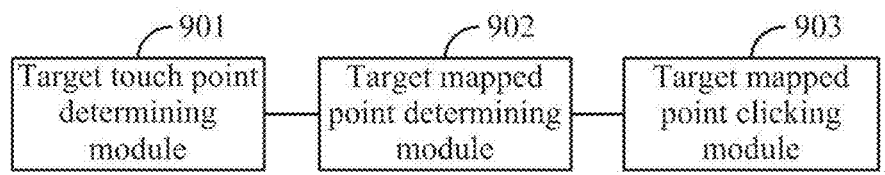
FIG. 9 is a schematic diagram of a device including a touch screen according to an embodiment of this disclosure.

As illustrated in FIG. 9, an embodiment of this disclosure provides a device including a touch screen, the device including:

A target touched point determining module 901 is configured to determine a target touched point in a first area of the touch screen according to a sliding operation or a clicking operation by a user in the first area;

A target mapped point determining module 902 is configured to determine a target mapped point in a second area of the touch screen, corresponding to the target touched point in the first area; and A target mapped point clicking module 903 is configured, if it is determined that the user needs to click on the target mapped point, to click on the target touched point in the first area, corresponding to the target mapped point in the second area to thereby click on the target mapped point, Where the first area and the second area of the touch screen do not overlap with each other.

Optionally the target touched point determining module 901 is configured:

To identify touched points touched by the user during the sliding operation in the first area; and To determine the last touched point in the first area during the sliding operation as the target touched point in the first area; and The target touched point determining module 901 configured to determine the target touched point in the first area according to an once-clicking operation by the user in the first area is configured:

To identify a touched point of the user during the clicking operation in the first area; and To determine the identified touched point as the target touched point in the first area.

Optionally the target touched point determining module 901 is further configured:

After a touched point of the user in the first area is identified, to determine a mapped point in the second area, corresponding to the identified touched point according to the position of the touched point in the first area.

Optionally the target touched point determining module 901 is configured:

For a touched point, to determine a second abscissa in the second area, corresponding to a first abscissa in the first area, of the touched point in the first area according to a correspondence relationship between the first abscissa in the first area and the second abscissa in the second area, and to determine a second ordinate in the second area, corresponding to a first ordinate in the first area, of the touched point in the first area according to a correspondence relationship between the first ordinate in the first area and the second ordinate in the second area; and To determine the mapped point in the second area, corresponding to the touched point in the first area according to the determined second abscissa and second ordinate.

Optionally the first abscissa in the first area corresponds to the second abscissa in the second area as follows:

$$X2=X1; \text{ and}$$

The first ordinate in the first area corresponds to the second ordinate in the second area as follows:

$$Y2-B=(H1/H2)\times(Y1-A);$$

Where X1 is the first abscissa of the touched point;
X2 is the second abscissa of the mapped point;
Y1 is the first ordinate of the touched point;
Y2 is the second ordinate of the mapped point;
A is an ordinate corresponding to a touched point at the abscissa of X1 on an upper boundary of the first area;
B is an ordinate corresponding to a mapped point at the abscissa of X1 on an upper boundary of the second area;
H1 is the distance between the touched point at the abscissa of X1 on the upper boundary of the first area and a touched point at the abscissa of X1 on a lower boundary of the first area; and
H2 is the distance between the mapped point at the abscissa of X1 on the upper boundary of the second area and a mapped point at the abscissa of X1 on a lower boundary of the second area.

Optionally the target touched point determining module 901 is further configured:

If the user performs the sliding operation in the first area of the touch screen, to move an operation focus for displaying the position of the mapped point, across the mapped points in the second area, corresponding to each of the touched points in the first area respectively; and If the user performs the clicking operation in the first area of the touch screen, to move the operation focus onto the target mapped point.

Optionally the target mapped point determining module 902 is configured:

If the user performs the sliding operation in the first area of the touch screen, to determine the last mapped point during sliding as the target mapped point; and If the user performs the clicking operation in the first area of the touch screen, to determine a mapped point corresponding to a touched point during the clicking operation as the target mapped point.

Optionally the target mapped point clicking module 903 is further configured:

If the clicking operation by the user in the first area is identified, to determine that the user needs to click on the target mapped point.

Optionally the target touched point determining module 901 is further configured:

If a touched position of and a touching operation by the user in the second area of the touch screen are identified, to perform the touching operation at the touched position in the second area.

Figure 10:
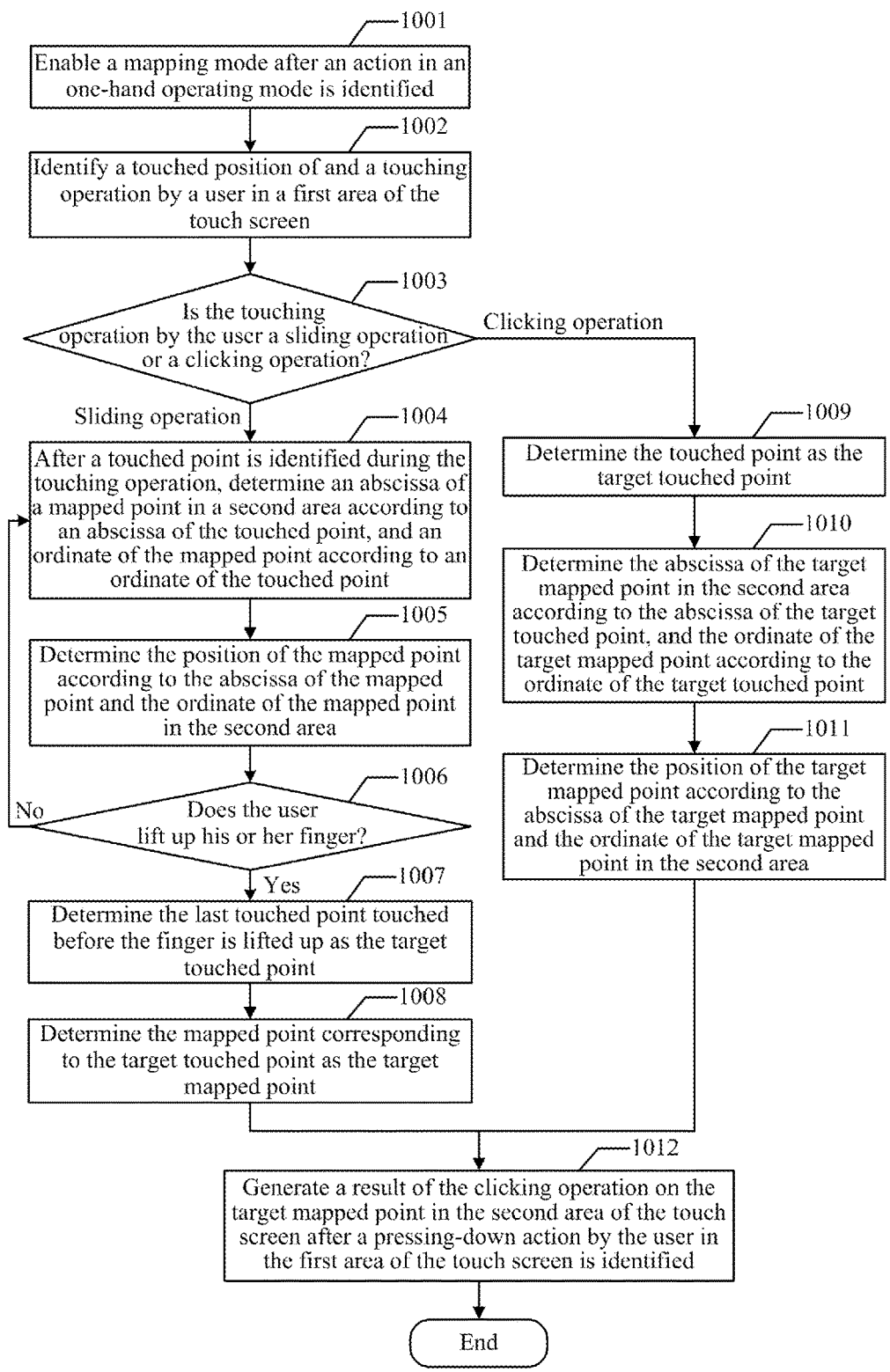
FIG. 10 is a schematic chart of a general flow of a method for operating on a touch screen according to an embodiment of this disclosure.
Figure 11:
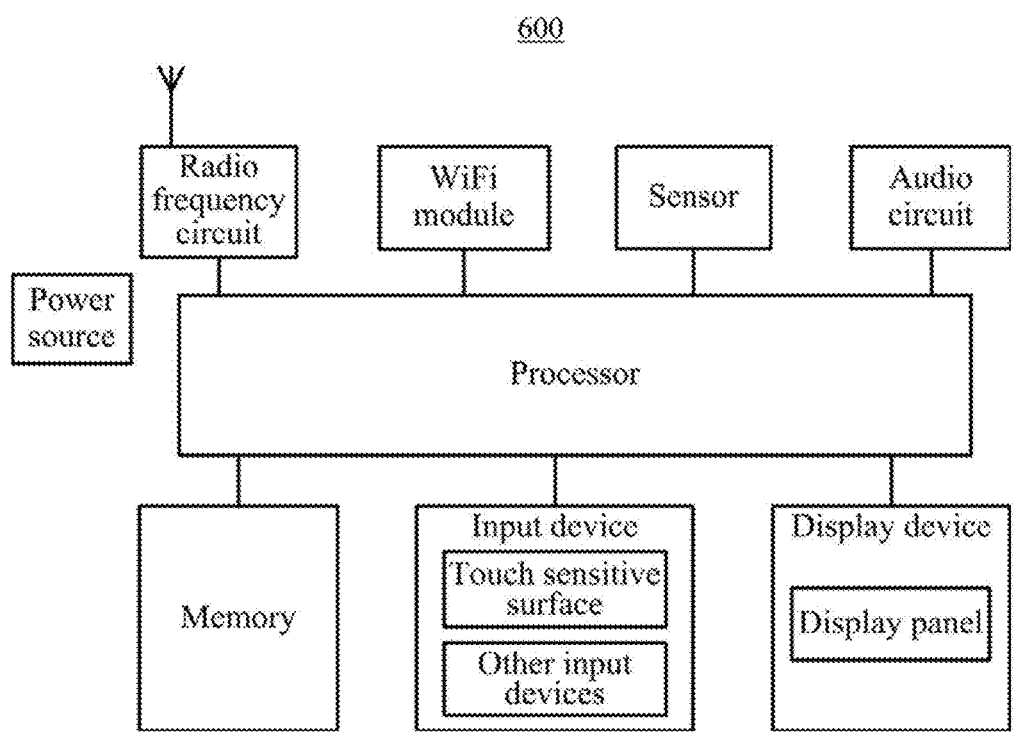
FIG. 11 is a schematic structural diagram of a device including a touch screen according to an embodiment of this disclosure.

As illustrated in FIG. 10, a general flow of a method for operating on a touch screen according to an embodiment of this disclosure includes:

The operation 1001 is to enable a mapping mode after an action in an one-hand operating mode is identified;

The operation 1002 is to identify a touched position of and a touching operation by a user in a first area of the touch screen;

The operation 1003 is to determine whether the touching operation by the user is a sliding operation or a clicking operation, and if the touching operation by the user is the sliding operation, to proceed to the operation 1004; or if the touching operation by the user is the clicking operation, to proceed to the operation 1009;

The operation 1004 is, after a touched point is identified during the touching operation, to determine an abscissa of a mapped point in a second area according to an abscissa of the touched point, and an ordinate of the mapped point according to an ordinate of the touched point, and to proceed to the operation 1005;

The operation 1005 is to determine the position of the mapped point according to the abscissa of the mapped point and the ordinate of the mapped point in the second area;

The operation 1006 is to determine whether the user lifts up his or her finger, and if so, to determine the last touched point of the sliding operation as a target touched point, and the mapped point corresponding thereto as a target mapped point, and to proceed to the operation 1007; otherwise, to return to the operation 1004;

The operation 1007 is to determine the last touched point touched before the finger is lifted up as the target touched point;

The operation 1008 is to determine the mapped point corresponding to the target touched point as the target mapped point, and to proceed to the operation 1012;

The operation 1009 is to determine the touched point as the target touched point, and to proceed to the operation 1010;

The operation 1010 is to determine the abscissa of the target mapped point in the second area according to the abscissa of the target touched point, and the ordinate of the target mapped point according to the ordinate of the target touched point, and to proceed to the operation 1011

The operation 1011 is to determine the position of the target mapped point according to the abscissa of the target mapped point in the second area, and the ordinate of the target mapped point, and to proceed to the operation 1012; and The operation 1012 is to generate a result of the clicking operation on the target mapped point in the second area of the touch screen after a pressing-down action by the user in the first area of the touch screen is identified.

As can be apparent from the disclosure above, in the method for operating on a touch screen according to the embodiment of this disclosure, a target touched point in a first area of the touch screen can be determined according to a sliding operation or a clicking operation by a user in the first area; and if it is determined that the user needs to click on a target mapped point, then the target touched point in the first area, corresponding to the target mapped point in the second area is clicked to thereby click on the target mapped point. In the embodiment of this disclosure, according to the operation by the user in one of the areas, the other area can be operated on, so the user can operate on the area of the touch screen, which is not easy to be touched, in the area which is easy to be touched, without shrinking or moving displayed contents.

Based upon the same inventive idea as the method for operating on a touch screen, an embodiment of this disclosure further provides a device including a touch screen, the device including one or more processors, and a memory in which one or more computer readable program codes are stored, wherein the one or more processors are configured to perform the one or more computer readable program codes to perform the operations of: determining a target touched point in a first area of the touch screen according to a sliding operation or a clicking operation by a user in the first area;

determining a target mapped point in a second area of the touch screen, corresponding to the target touched point in the first area; and if it is determined that the user needs to click on the target mapped point, then clicking on the target touched point in the first area, corresponding to the target mapped point in the second area to thereby click on the target mapped point, where the first area and the second area of the touch screen do not overlap with each other.

In some embodiments of the disclosure, determining the target touched point in the first area according to the sliding operation by the user in the first area includes: identifying touched points touched by the user during the sliding operation in the first area; and determining the last touched point in the first area during the sliding operation as the target touched point in the first area; and determining the target touched point in the first area according to the clicking operation by the user in the first area includes: identifying a touched point of the user during the clicking operation in the first area; and determining the identified touched point as the target touched point in the first area.

In some embodiments, before clicking on the target touched point in the first area, corresponding to the target mapped point in the second area to thereby click on the target mapped point, the processor is further configured to perform the operation of:

After a touched point of the user in the first area is identified, determining a mapped point in the second area, corresponding to the identified touched point according to the position of the touched point in the first area.

The device 600 including a touch screen can be any one of various handheld devices (e.g., a handset, a tablet computer, a PDA, etc.), and can include a processor including one or more processing cores, a radio frequency circuit, a memory including one or more computer readable storage mediums, an input device, a display device, a sensor, an audio circuit, a Wi-Fi module, a power source, and other components. Those skilled in the art can appreciate that the device 600 including a touch screen in this embodiment will not be limited to the structure as illustrated, but can include more or less components or some of the components can be combined or different components can be arranged, where:

The radio frequency circuit can be configured to receive and transmit a signal in receiving and transmitting information or in communication, and particularly to receive and then pass downlink information of a base station to the one or more processors for processing; and to send uplink data to the base station. Typically the radio frequency circuit includes but will not be limited to an antenna, at least one amplifier, a tuner, one or more oscillators, a Subscriber Identifier Module (SIM) card, a transceiver, a coupler, a Low Noise Amplifier (LNA), a duplexer, etc. Moreover the radio frequency circuit can further communicate wirelessly with a network and another device in any one of communication standards or protocols including but not limited to a Global System of Mobile communication (GSM), a General Packet Radio Service (GPRS), a Code Division Multiple Access (CDMA), a Wideband Code Division Multiple Access (WCDMA), a Long Term Evolution (LTE), an e-mail, a Short Messaging Service (SMS), etc.

The memory can be configured to store software programs and modules, and the processor is configured to run the software programs and modules stored in the memory to thereby perform various function applications and data processing. The memory can generally include a program storage area and a data storage area, where an operating system, applications required for at least one function (e.g., an audio playing function, an image playing function, etc.), etc., can be stored in the program storage area; and data created for use of the device 600 including a touch screen (e.g., audio data, an address book, etc.), etc., can be stored in the data storage area. Moreover the memory can include a high-speed random access memory, and can further include a nonvolatile memory, e.g., at least one magnetic disks memory device, a flash memory device or another volatile solid memory device. Correspondingly the memory can further include a memory controller configured to provide an access of the processor and the input device to the memory.

The input device can be configured to receive input digital or character information and to generate a keyboard, mouse, joystick, optical or track ball signal input related to user setting and function control. Particularly the input device can include a touch sensitive surface and another input device. The touch surface, also referred to as a touch display screen or a touch control panel, can collect a touch operation by a user thereon or in proximity thereto (e.g., an operation by the user using a finger, a touch pen or any other appropriate object or attachment on or in proximity to the touch sensitive surface) and drive a corresponding connected device by a preset program. Optionally the touch sensitive surface can include two components of a touch detection device and a touch controller, where the touch detection device detects the position of touching by the user, and detects a signal as a result of the touch operation and transfers the signal to the touch controller; and the touch controller receives the touch signal from the touch detection device, and converts it into coordinates of a touched point and further transfers them to the processor, and can receive and execute a command sent by the processor. Moreover the touch sensitive surface can be embodied in various types of resistive, capacitive, infrared, surface sound wave and other types. The input device can further include another input device in addition to the touch sensitive surface. Particularly the other input device can include but will not be limited to one or more of a physical keyboard, functional keys (e.g., volume control buttons, a power button, etc.), a track ball, a mouse, a joystick, etc.

The display device can be configured to display information entered by the user or information provided to the user and various graphic user interfaces of the device 600 including a touch screen, where these graphic user interfaces can be composed of graphics, texts, icons, videos or any combination thereof. The display device can include a display panel, and optionally the display panel can be configured in the form of a Liquid Crystal Display (LCD), an Organic Light-Emitting Diode (OLED) display, etc. Furthermore the touch sensitive surface can overlie the display panel, and the touch sensitive surface detecting the touch operation thereon or in proximity thereto transfers it to the processor to determine the type of the touch event, and thereafter the processor provides a corresponding visual output on the display panel according to the type of the touch event. Although the touch sensitive surface and the display panel are embodied in this embodiment as two separate components to perform the input and output functions, the touch sensitive surface and the display panel can be integrated to perform the input and output functions in some embodiments.

The device 600 including a touch screen can further include at least one sensor, e.g., an optical sensor, a motion sensor and other sensors. The optical sensor can include an ambient optical sensor and a proximity sensor, where the ambient optical sensor can adjust the brightness of the display panel according to the illumination of ambient light rays, and the proximity sensor can disable the display panel and/or a backlight when the device 600 including a touch screen moves in proximity to an ear. A gravity acceleration sensor which is a motion sensor can detect the magnitudes of accelerations in respective directions (typically three axes), and can detect the magnitude and the direction of gravity when the sensor is stationary and can be configured to perform applications of identifying the posture of a handset (e.g., switching between landscape and portrait modes, relevant games, calibration of the posture of a magnetometer, etc.), a relevant function of identifying vibration (e.g., a pedometer, a knock, etc.), etc.; and the device 600 including a touch screen can be further configured with a gyroscope, a barometer, a hygrometer, a thermometer, an infrared sensor and other sensors, and a repeated description of these components will be omitted here.

The audio circuit, a speaker and a transducer can provide an audio interface between the user and the device 600 including a touch screen. The audio circuit can receive and convert audio data into an electric signal and transmit the electric signal to the speaker, which is converted by the speaker into an audio signal for output; and on the other hand, the transducer converts a collected audio signal into an electric signal which is received by the audio circuit and then converted into audio data, and the audio data is further output to the processor for processing and then transmitted by the radio frequency circuit to another device, for example, or the audio data is output to the memory for further processing. The audio circuit may further include an earphone jack for communication between an external earphone and the device 600 including a touch screen.

Wi-Fi belongs to short-distance wireless transmission, and the device 600 including a touch screen can assist through the Wi-Fi module the user in transmitting and receiving an email, browsing a webpage, accessing stream media, etc., to thereby provide the user with a wireless and broadband access to the Internet. Although the WiFi module is illustrated in this embodiment, it can be appreciated that it may not necessarily be included in the device 600 including a touch screen, but may be omitted as needed without departing from the spirit of the disclosure.

The processor is a control center of the device 600 including a touch screen, has the respective components connected by various interfaces and lines, and runs or executes the software programs and/or modules stored in the memory and invokes the data stored in the memory to perform the various functions of the device 600 including a touch screen and process the data to thereby manage and control the device 600 including a touch screen as a whole. Optionally the processor can include one or more processing cores; and preferably the processor can be integrated with an application processor and a modem processor, where the application processor generally handles the operating system, the user interfaces, the applications, etc., and the modem processor generally handles wireless communication. As can be appreciated, the modem processor may not be integrated into the processor.

The device 600 including a touch screen further includes a power source (e.g., a battery) powering the respective components, and preferably the power source can be logically connected with the processor through a power management system to thereby perform charging and discharging management, power consumption management, and other functions through the power management system. The power source can further include one or more DC or AC power sources, recharging systems, power source failure detection circuits, power source transformers or inverters, power source status indicators, and other any appropriate components.

Although not illustrated, the device 600 including a touch screen can further include a camera, a Bluetooth module, etc., and a repeated description thereof will be omitted here. Particularly in this embodiment, the device 600 including a touch screen is a touch screen display, and the device 600 including a touch screen further includes a memory, and one or more programs stored in the memory and configured to be performed by one or more processors. The one or more programs include instructions for performing the operations of:

Determining a target touched point in a first area of the touch screen according to a sliding operation or a clicking operation by a user in the first area; determining a target mapped point in a second area of the touch screen, corresponding to the target touched point in the first area; and if it is determined that the user needs to click on the target mapped point, then clicking on the target touched point in the first area, corresponding to the target mapped point in the second area to thereby click on the target mapped point, Where the first area and the second area of the touch screen do not overlap with each other.

An embodiment of the disclosure further provides a computer readable storage medium storing in which one or more programs to be executed by one or more processors to perform a method for operating on a touch screen, the method including:

Determining a target touched point in a first area of the touch screen according to a sliding operation or a clicking operation by a user in the first area;

Determining a target mapped point in a second area of the touch screen, corresponding to the target touched point in the first area; and If it is determined that the user needs to click on the target mapped point, then clicking on the target touched point in the first area, corresponding to the target mapped point in the second area to thereby click on the target mapped point, Where the first area and the second area of the touch screen do not overlap with each other.

The computer readable storage medium may be a computer readable storage medium included in the memory in the embodiment above; or may be a separate computer readable storage medium which is not installed into any apparatus.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A device comprising:
a touch screen;
one or more processors; and
a memory in which one or more computer readable program codes are stored, wherein the one or more processors are configured to execute the one or more computer readable program codes to perform the operations of:
determining a target touched point in a first area of the touch screen according to a sliding operation or a first clicking operation by a user in the first area, wherein the first area is an arcuate shape defined by a finger sliding operation performed prior to determining the target touched point, an upper boundary of the arcuate shape of the first area is defined by a trajectory of an upper edge of the finger sliding operation performed prior to determining the target touched point, and a lower boundary of the arcuate shape of the first area is defined by a trajectory of a lower edge of the finger sliding operation performed prior to determining the target touched point;
determining a target mapped point in a second area of the touch screen, the target mapped point corresponding to the target touched point in the first area, the second area including an arcuate lower boundary aligned with the upper boundary of the first area, the touch screen including a third area for normal touching operation without determining a target mapped point, the third area including an arcuate upper boundary aligned with the lower boundary of the first area; and detecting a second clicking operation from the user on the target touched point in the first area corresponding to the target mapped point in the second area, to thereby select the target mapped point;
wherein the first area, the second area and the third area of the touch screen do not overlap with each other, X1 is a first abscissa of the target touched point in the first area, X2 is a second abscissa of the target mapped point in the second area, and X1=X2;
wherein a first ordinate in the first area corresponds to a second ordinate in the second area as follows:

$$Y2-B=(H1/H2)\times(Y1-A);$$

Y1 is the first ordinate of the target touched point in the first area;
Y2 is the second ordinate of the target mapped point in the second area;
A is an ordinate corresponding to the target touched point at the abscissa of X1 on an upper boundary of the first area;
B is an ordinate corresponding to the target mapped point at the abscissa of X1 on an upper boundary of the second area;
H1 is a distance between the target touched point at the abscissa of X1 on the upper boundary of the first area and the target touched point at the abscissa of X1 on a lower boundary of the first area; and
H2 is a distance between the target mapped point at the abscissa of X1 on the upper boundary of the second area and the target mapped point at the abscissa of X1 on a lower boundary of the second area.

2. The device according to claim 1, wherein determining the target touched point in the first area according to the sliding operation by the user in the first area comprises:
identifying touched points touched by the user during the sliding operation in the first area; and
determining a last one of the touched points in the first area during the sliding operation as the target touched point in the first area; and
wherein determining the target touched point in the first area according to the first clicking operation by the user in the first area comprises:
identifying a touched point of the user during the first clicking operation in the first area; and
determining the identified touched point as the target touched point in the first area.

3. The device according to claim 2, wherein before detecting the second clicking operation on the target touched point in the first area corresponding to the target mapped point in the second area, the processor is further configured to perform the operation of:
after the touched point of the user in the first area is identified, determining the mapped point in the second area corresponding to the identified touched point according to a position of the identified touched point in the first area.

4. The device according to claim 3, wherein the operation of determining the mapped point in the second area corresponding to the identified touched point according to the position of the identified touched point in the first area comprises:
for the identified touched point, determining the second abscissa in the second area corresponding to the first abscissa in the first area of the identified touched point according to a correspondence relationship between the first abscissa in the first area and the second abscissa in the second area, and determining a second ordinate in the second area corresponding to a first ordinate in the first area of the identified touched point according to a correspondence relationship between the first ordinate in the first area and the second ordinate in the second area; and determining the mapped point in the second area corresponding to the identified touched point in the first area according to the determined second abscissa and second ordinate.

5. The device according to claim 2, wherein the processor is further configured to perform operations of:

when the user performs the sliding operation in the first area of the touch screen, moving an operation focus for displaying the position of the mapped point across the mapped points in the second area corresponding to each of the touched points in the first area during the sliding operation; and when the user performs the first clicking operation in the first area of the touch screen, moving the operation focus onto the target mapped point.

6. The device according to claim 1, wherein the operation of determining the target mapped point in the second area of the touch screen corresponding to the target touched point in the first area comprises:

when the user performs the sliding operation in the first area of the touch screen, determining the last mapped point during sliding as the target mapped point; and when the user performs the first clicking operation in the first area of the touch screen, determining a mapped point corresponding to a touched point during the first clicking operation.

7. The device according to claim 1, wherein after determining the target mapped point in the second area of the touch screen corresponding to the target touched point in the first area, the processor is further configured to perform operations of:

when the first clicking operation by the user in the first area is identified, determining that the target mapped point needs to be clicked.

8. The device according to claim 1, wherein the processor is further configured to perform operations of:

when a touched position and a touching operation by the user in the second area of the touch screen are identified, performing an operation corresponding to the touched position in the second area.

9. A storage medium, storing therein computer readable program codes configured to be executed by one or more processors to perform operations of:

determining a target touched point in a first area of the touch screen according to a sliding operation or a first clicking operation by a user in the first area, wherein the first area is an arcuate shape defined by a finger sliding operation prior to determining the target touched point, an upper boundary of the arcuate shape of the first area is defined by a trajectory of an upper edge of the finger sliding operation prior to determining the target touched point, and a lower boundary of the arcuate shape of the first area is defined by a trajectory of a lower edge of the finger sliding operation prior to determining the target touched point;

determining a target mapped point in a second area of the touch screen, the target mapped point corresponding to the target touched point in the first area, the second area including an arcuate lower boundary aligned with the upper boundary of the first area, the touch screen including a third area for normal touching operation without determining a target mapped point, the third area including an arcuate upper boundary aligned with the lower boundary of the first area; and detecting a clicking operation from the user on the target touched point in the first area corresponding to the target mapped point in the second area, to thereby select the target mapped point; wherein the first areas, the second area and the third area of the touch screen do not overlap with each other, X1 is a first abscissa of the target touched point in the first area, X2 is a second abscissa of the target mapped point in the second area, and X1=X2;

wherein a first ordinate in the first area corresponds to a second ordinate in the second area as follows:

$$Y2-B=(H1/H2)\times(Y1-A);$$

Y1 is the first ordinate of the target touched point in the first area;

Y2 is the second ordinate of the target mapped point in the second area;

A is an ordinate corresponding to the target touched point at the abscissa of X1 on an upper boundary of the first area;

B is an ordinate corresponding to the target mapped point at the abscissa of X1 on an upper boundary of the second area;

H1 is a distance between the target touched point at the abscissa of X1 on the upper boundary of the first area and the target touched point at the abscissa of X1 on a lower boundary of the first area; and H2 is a distance between the target mapped point at the abscissa of X1 on the upper boundary of the second area and the target mapped point at the abscissa of X1 on a lower boundary of the second area.

10. The storage medium according to claim 9, wherein determining the target touched point in the first area according to the sliding operation by the user in the first area comprises:

identifying touched points touched by the user during the sliding operation in the first area; and determining a last one of the touched points in the first area during the sliding operation as the target touched point in the first area; and wherein determining the target touched point in the first area according to the first clicking operation by the user in the first area comprises:

identifying a touched point of the user during the first clicking operation in the first area; and determining the identified touched point as the target touched point in the first area.

11. A method for operating on a touch screen, the method comprising:

determining a target touched point in a first area of the touch screen according to a sliding operation or a first clicking operation by a user in the first area, wherein the first area is an arcuate shape defined by a finger sliding operation prior to determining the target touched point, an upper boundary of the arcuate shape of the first area is defined by a trajectory of an upper edge of the finger sliding operation prior to determining the target touched point, and a lower boundary of the arcuate shape of the first area is defined by a trajectory of a lower edge of the finger sliding operation prior to determining the target touched point;

determining a target mapped point in a second area of the touch screen, the target mapped point corresponding to the target touched point in the first area, the second area including an arcuate lower boundary aligned with the upper boundary of the first area, the touch screen including a third area for normal touching operation without determining a target mapped point, the third area including an arcuate upper boundary aligned with the lower boundary of the first area; and detecting a second clicking operation from the user on the target touched point in the first area corresponding to the target mapped point in the second area, to thereby select the target mapped point; wherein the first area, the second area and the third area of the touch screen do not overlap with each other, X1 is a first abscissa of the target touched point in the first area, X2 is a second abscissa of the target mapped point in the second area, and X1=X2;

wherein a first ordinate in the first area corresponds to a second ordinate in the second area as follows:

$$Y2-B=(H1/H2)\times(Y1-A);$$

Y1 is the first ordinate of the target touched point in the first area;

Y2 is the second ordinate of the target mapped point in the second area;

A is an ordinate corresponding to the target touched point at the abscissa of X1 on an upper boundary of the first area;

B is an ordinate corresponding to the target mapped point at the abscissa of X1 on an upper boundary of the second area;

H1 is a distance between the target touched point at the abscissa of X1 on the upper boundary of the first area and the target touched point at the abscissa of X1 on a lower boundary of the first area; and H2 is a distance between the target mapped point at the abscissa of X1 on the upper boundary of the second area and the target mapped point at the abscissa of X1 on a lower boundary of the second area.

12. The method according to claim 11, wherein determining the target touched point in the first area according to the sliding operation by the user in the first area comprises:
   identifying touched points touched by the user during the sliding operation in the first area; and
   determining a last one of the touched points in the first area during the sliding operation as the target touched point in the first area; and
   wherein determining the target touched point in the first area according to the first clicking operation by the user in the first area comprises:
   identifying a touched point of the user during the first clicking operation in the first area; and
   determining the identified touched point as the target touched point in the first area.

13. The method according to claim 12, wherein before detecting the second clicking operation on the target touched point in the first area corresponding to the target mapped point in the second area, the method further comprises:
   after the touched point of the user in the first area is identified, determining the mapped point in the second area corresponding to the identified touched point according to a position of the identified touched point in the first area.

14. The method according to claim 13, wherein determining the mapped point in the second area corresponding to the identified touched point according to the position of the identified touched point in the first area comprises:
   for the identified touched point, determining the second abscissa in the second area corresponding to the first abscissa in the first area of the identified touched point according to a correspondence relationship between the first abscissa in the first area and the second abscissa in the second area, and determining a second ordinate in the second area corresponding to a first ordinate in the first area of the identified touched point according to a correspondence relationship between the first ordinate in the first area and the second ordinate in the second area; and
   determining the mapped point in the second area corresponding to the identified touched point in the first area according to the determined second abscissa and second ordinate.

15. The method according to claim 12, further comprising:
   when the user performs the sliding operation in the first area of the touch screen, moving an operation focus for displaying the position of the mapped point across the mapped points in the second area corresponding to each of the touched points in the first area during the sliding operation; and
   when the user performs the first clicking operation in the first area of the touch screen, moving the operation focus onto the target mapped point.

16. The method according to claim 11, wherein determining the target mapped point in the second area of the touch screen corresponding to the target touched point in the first area comprises:
   when the user performs the sliding operation in the first area of the touch screen, determining the last mapped point during sliding as the target mapped point; and
   when the user performs the first clicking operation in the first area of the touch screen, determining a mapped point corresponding to a touched point during the first clicking operation.

17. The method according to claim 11, wherein after determining the target mapped point in the second area of the touch screen corresponding to the target touched point in the first area, the method further comprises:
   when the first clicking operation by the user in the first area is identified, determining the target mapped point needs to be clicked.

18. The method according to claim 11, further comprising when a touched position of and a touching operation by the user in the second area of the touch screen are identified, performing an operation corresponding to the touched position in the second area.

* * * * *